(12) United States Patent
Holmegaard et al.

(10) Patent No.: US 12,253,397 B2
(45) Date of Patent: Mar. 18, 2025

(54) ULTRASOUND FLOW METER

(71) Applicant: Kamstrup A/S, Skanderborg (DK)

(72) Inventors: Lotte Holmegaard, Skanderborg (DK); Peter Schmidt Laursen, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 294 days.

(21) Appl. No.: 17/865,548

(22) Filed: Jul. 15, 2022

(65) Prior Publication Data
US 2023/0012764 A1 Jan. 19, 2023

(30) Foreign Application Priority Data

Jul. 19, 2021 (EP) ..................................... 21186379

(51) Int. Cl.
| | |
|---|---|
| *G01F 1/66* | (2022.01) |
| *F16B 21/06* | (2006.01) |
| *G01F 1/667* | (2022.01) |
| *G01F 15/14* | (2006.01) |
| *G01N 29/02* | (2006.01) |
| *G01N 29/22* | (2006.01) |

(52) U.S. Cl.
CPC .............. *G01F 1/662* (2013.01); *F16B 21/06* (2013.01); *G01F 1/667* (2013.01); *G01F 15/14* (2013.01); *G01N 29/02* (2013.01); *G01N 29/222* (2013.01); *G01N 29/223* (2013.01); *G01N 29/22* (2013.01)

(58) Field of Classification Search
CPC .......... G01F 1/662; G01F 1/667; G01F 15/14; G01F 15/18; G01N 29/02; G01N 29/222; G01N 29/223; G01N 29/22
See application file for complete search history.

(56) References Cited

U.S. PATENT DOCUMENTS

| | | | | |
|---|---|---|---|---|
| 4,019,373 | A * | 4/1977 | Freeman | G01F 1/662 73/644 |
| 2012/0031198 | A1* | 2/2012 | Skallebaek | G01F 1/662 29/840 |
| 2017/0314978 | A1 | 11/2017 | Drachmann | |
| 2019/0310116 | A1* | 10/2019 | Pilegaard | G01F 1/662 |

FOREIGN PATENT DOCUMENTS

| | | |
|---|---|---|
| DE | 2526817 A1 | 1/1976 |
| DE | 102006015217 A1 | 10/2007 |
| DE | 102006015218 A1 | 10/2007 |
| EP | 3550272 B1 | 3/2021 |

* cited by examiner

*Primary Examiner* — Benjamin R Schmitt
(74) *Attorney, Agent, or Firm* — McGlew and Tuttle, P.C.

(57) ABSTRACT

An ultrasound flow meter includes a housing (1) which includes a channel (2) for leading through a fluid, which fluid flow rate is to be measured. Two ultrasound transducers are arranged on the wall which delimits the channel (2), within the housing (1). The ultrasound transducers are fixed within the housing by a non-releasable snap connection and/or clamping connection.

19 Claims, 7 Drawing Sheets

ULTRASOUND FLOW METER

CROSS REFERENCE TO RELATED APPLICATIONS

This application claims the benefit of priority under 35 U.S.C. § 119 of European Application 21 186 379.0, filed Jul. 19, 2021, the entire contents of which are incorporated herein by reference.

TECHNICAL FIELD

The invention relates to an ultrasound flow meter with housing and a housing-side channel for leading through a fluid whose flow is to be measured. The flow measurement is effected by way of ultrasound and for this at least one ultrasound transducer is arranged on a wall within the housing, said wall delimiting the channel.

TECHNICAL BACKGROUND

Such ultrasound flow meters are counted as belonging to the state of the art and are typically applied in order to determine the service water consumption of residence units or other consumers, but also as part of heat quantity meters, concerning which the thermal consumption is determined on the basis of the flow quantity and the temperature difference.

The invention starts from the state of the art as is known from EP 3 550 272 B 1. There, an ultrasound flow meter with a housing is described, said housing comprising a channel which passes through the housing and which is provided for leading through a liquid. The flow quantity which flows through this channel is determined by ultrasound measurement. For this, two ultrasound transducers are provided, of which one operates as an ultrasound emitter and the other as an ultrasound receiver and these bear on the wall which delimits the channel, within the housing. The ultrasound transducers are herein each arranged on sections of a common circuit board which is integrated within the housing and which receives the electrical and electronic components. The ultrasound transducers are arranged on circuit board sections which are movable in a limited manner with respect to the remaining circuit board, so that the ultrasound transducers can be impinged with a spring force by way of helical springs which act upon the circuit board. The springs are each supported by a rear side carrier element which together with the circuit board is fastened on pins which projects up from the housing base, by way of two screws, wherein the screws engage into these pins. The housing is closed off by a cover which is peripherally welded to the housing.

For the sonic coupling between the ultrasound transducers and the channel, it is essential that the ultrasound transducers are pressed onto the wall with a sufficient force, and specifically such that this is also ensured given temperature fluctuations and over long operating times, for example 15 or 20 years. On the other hand, concerning such ultrasound flow meters, these are devices which are manufactured in large numbers and concerning which even small improvements, be it on manufacture or on assembly, can lead to significant savings.

SUMMARY

Against this background, it is an object of the invention according to the application to improve an ultrasound flow meter of the initially mentioned type. Furthermore, a method for generating a pressing force between an ultrasound transducer and a channel wall of an ultrasound flow meter is to be provided, said method ensuring a simple and reliable force subjection which is stable over the longer term.

The part of this object in regard to the device is achieved by an ultrasound flow meter with the features of the device of the invention, the method part of the object by a method according to the method of the invention. Advantageous embodiments of the invention are to be derived from the description, the claims and the drawings.

The ultrasound flow meter according to the invention comprises a housing and a housing-side channel for leading through a fluid, whose flow is to be measured. For this, at least one ultrasound transducer is arranged on a wall within the housing, said wall delimiting the channel. According to the invention, the at least one ultrasound transducer is fixed within the housing by way of at least one preferably non-releasable snap connection and/or clamping connection.

The ultrasound flow meter according to the invention in particular is provided for detecting a flow rate of a fluid. For this, a channel is provided on or in the housing, as well as at least one ultrasound transducer which is arranged directly or indirectly within the housing on a wall which delimits the channel. The channel is either part of the housing but is sealed with respect to the inside of the housing as well as with respect to the surroundings or is formed by a pipe which passes through the housing or at least with a part of its wall leads into the inside of the housing, so that an ultrasound transducer can be attached there such that ultrasound waves can be transmitted onto the liquid or vice versa. Basically, at least one ultrasound transducer is necessary for the measurement, but in practice the arrangement of two ultrasound transducers of which one operates as an emitter and the other as a receiver or vice versa has proven its worth. In order to fix the ultrasound transducer within the housing in a quick and reliable manner, according to the invention one envisages arranging a snap connection and/or clamping connection within the housing, said connection preferably being non-releasable and fixing the ultrasound transducer within the housing, in particular bearing upon the wall which delimits the channel, in a reliable manner which is stable over the longer-term, in a simple assembly step. Herein, concerning the connection, this is preferably a snap connection or clamping connection, but given a suitable configuration, a snap connection or clamping connection is sufficient, in order to achieve this.

In contrast to the state of the art, given a suitable configuration of this snap connection and clamping connection, the fixation of the ultrasound transducer or transducers within the housing can be effected by a simple plug-in procedure, and a rotation of tools as is necessary for the screw connections which are provided in the state of the art can be done away with.

The method according to the invention permits the generation of a pressing force between a e.g. piezoelectric ultrasound transducer and a channel wall of the ultrasound flow meter by way of the ultrasound transducer being fastened by way of a snap connection and/or clamping connection and simultaneously being impinged with a spring force. Due to the fact that a spring force impingement is effected simultaneously with the fastening, a pressing force which is stable over the longer term is ensured, without having to provide a separate assembly of the spring means which are necessary for this. The spring-loading which is necessary for the generation of spring force is herein generated with the fastening in one working procedure, which is advantageous.

It is particularly advantageous if within the housing at least one clamping pin is provided for each ultrasound transducer and each ultrasound transducer is fastened to the clamping pin with a spring clamping disc. Herein, preferably a clamping pin pair is provided for each ultrasound transducer, said pair being arranged at both sides of the ultrasound transducer. In particular, if the housing is configured as an injection molded component, this pin can be integrally formed in a manner rising perpendicularly from the housing base, as is described in yet more detail further below. If as is typically the case with such ultrasound flow meters, two ultrasound transducers are provided close to the channel ends in the housing, the fastening is then advantageously effected by way of four clamping pins, each in pairs at one side, wherein the circuit board can advantageously also be fixed within the housing by these clamping pins, said circuit board carrying the electric and electronic components. The clamping pins can be cylindrical, taper in a slightly conical manner or however have a polygonal cross section, depending on the provided clamping spring disc. Clamping spring discs are counted as belonging to the state of the art, but are typically not necessarily of metal and most have a peripherally closed ring body, from which inwardly projecting spring tongues project in an extensive manner, said spring tongues on being pushed onto the clamping pin in the axis direction of the pin being clamped with respect to this and applying a certain spring effect. The connection is configured as a non-releasable connection and can be possibly assisted by latching indentations in the pin, for example by way of peripheral grooves at a small axial distance to one another. Herein, the pin diameter is always slightly larger than the free passage within the clamping spring disc, so that a clamping effect and spring effect arises on pushing-on.

The ultrasound flow meter mostly within the housing comprises a circuit board with electric and electronic components as well as a cover which closes the housing, as is counted as belonging to the state of the art. Advantageously, according to a further development of the invention, an intermediate housing is provided within the housing, said intermediate housing being arranged between the housing cover and the circuit board in the housing, being fastened within the housing by clamping spring and receiving spring means for the force subjection of the at least one ultrasound transducer and the clamping spring discs and holding these preferably with a positive fit. Such an intermediate housing in particular is of particular advantage concerning assembly technology since this together with the spring means for force impingement which are incorporated therein and the clamping disc springs can be inserted into the housing in one working procedure and herein simultaneously the ultrasound transducer and the circuit board are fastened within the housing and herein the spring force can be generated for pressing the ultrasound transducers onto the channel wall.

Advantageously, the intermediate housing is formed from plastic, typically configured as a plastic injection molded part, wherein the spring means and the clamping spring discs preferably consist of metal and are integrated into the intermediate housing or between the housing and the intermediate housing, with a positive fit. In this manner, the circuit board and the intermediate housing can be fixed in the housing in one working procedure. Herein, the circuit board carries the ultrasound transducers which are each arranged on a limitedly movable circuit board section which is pressed onto the channel wall in the axial direction of the ultrasound transducer by way of the spring means. Herein, the spring means for the force impingement of an ultrasound transducer can be configured in the known manner as helical springs which are then advantageously arranged at the intermediate housing, so that a separate assembly within the housing can be done away with.

However, it is particularly advantageous if the spring means for the force impingement of an ultrasound transducer and the means for the clamping fastening of the intermediate housing are configured as one piece. This can be advantageously realized by a spring clip which comprises a pressing spring for an ultrasound transducer as well as at least one clamping spring disc. Preferably, this spring clip is configured as a spring sheet which on the one hand is shaped such that it subjects the ultrasound transducer to spring force, thus presses this onto the channel wall in the installed state and on the other hand forms the clamping spring discs. Such clamping spring discs can be formed in the clip ends without further ado, so that only one spring component, specifically such a spring sheet which is configured as a spring clip, is to be provided for each ultrasound transducer, said spring sheet advantageously being incorporated laterally into the intermediate housing before the assembly, in order then together with this to be able to be assembled by way of simply pressing on.

Basically, such a spring clip can comprise a clamping spring disc and is otherwise configured such that it forms the necessary clamping force for the ultrasound transducer. Preferably however, two clamping spring discs are formed in the spring clip, in order to ensure a symmetrically force introduction onto the ultrasound transducer, as well as a good fastening.

In order to fix such a spring clip on the intermediate housing, it is advantageous to provide a radially open tongue pair on the intermediate housing, preferably to provide two such open tongue pairs which lie diametrically opposite one another, each positively receive a spring clip and through which the housing-side clamping pin pair passes in the assembled state. The clamping fastening is therefore effected via the clamping spring discs which are formed in the clips. Since the spring clips are fixed positively between the radial tongues, hence on the one hand the spring clip is fixed on the intermediate housing for the purpose of the assembly and on the other hand after pressing in the intermediate housing with the spring clips, these components are incorporated in the housing in their designated position and function.

Advantageously, a spring clip is configured such that in a lateral view it has a U-shaped central section whose web impinges the ultrasound transducer or the circuit board section, on which the ultrasound transducer is arranged. Herein, the free limb ends of the U-shaped central section are bent away transversely outwards, then each merge into a section which runs parallel to the limb and with their free end section are bent towards the limb, wherein each end section is configured as a clamping spring disc. Given this configuration, the entirety of the clip is used as a spring for generating the pressing force of the ultrasound transducer upon the channel wall, whereas the clamping spring discs which are shaped in the end sections serve for the clamping fastening of the spring clip as well as of the intermediate housing, by way of these being integrated in a positive manner amid the inclusion of the circuit board which is arranged between the housing base and the intermediate housing.

In an alternative configuration, the spring clip likewise has a central section which is U-shaped in a lateral view and whose web impinges the ultrasound transducer or the circuit board section, on which the ultrasound transducer is arranged, but then with the free limb ends of the U merge into a section which is arcuately bent outwards by 180°, in order then with the end-side limb ends to comprise end sections which are directed towards the limbs or away therefrom, are likewise configured as clamping spring discs and are arranged roughly parallel to the web.

In an alternative embodiment, the limbs of the U-shaped central section are configured tapering obliquely inwards and the free limb ends of the U are bent obliquely outwards and upwards, in order to then merge into a section which runs parallel to the limb, wherein with their free end section they are bent away towards the limb, wherein again the clamping spring discs are formed. The variance of the shape of the clip permits a quasi arbitrary setting of the spring force and spring path as well as the characteristic line of the spring. The aforedescribed spring clips are only to be understood by way of example, and the invention is not limited to a spring clip which is U-shaped in the central section, but this arrangement is particularly advantageous due to the configuration.

In order to influence the spring characteristic line, the sheet can be configured with a different thickness in sections. However, concerning manufacturing technology, it is simpler to use as sheet of an essentially constant thickness and to provide recesses in sections, in particular in the regions between the central U-shaped section and the end sections. By way of this, the springs can be configured softer without reducing the necessary clamping force in the region of the clamping disc springs.

Basically, the ultrasound transducer or transducers can be arranged as individual components. However, it is particularly advantageous to arrange these at the circuit board, since this simplifies the installation and the electrical wiring. In order to ensure the necessary movability, it is advantageous to provide a circuit board section for each ultrasound transducer, said section being limitedly movable with respect to the remaining circuit board, thus typically only being connected to the remaining circuit board by a longitudinally extended arm, so that this section is arranged on the circuit board in an elastically movable manner. This fastening of the ultrasound transducer on this circuit board section is advantageously effected with a permanent-elastic, electrically conductive adhesive which on the one hand ensures the electrical contacting and on the other hand the fastening on the circuit board section. Due to the permanent elasticity, it is ensured that no brittleness occurs there even after years of use and thus the desired connection is maintained mechanically and electrically.

Advantageously, piezoelectric transducer elements are used as ultrasound transducers and these typically have a cylindrical shape and can be contacted at their two opposite face sides. Such ultrasound transducers are advantageously electrically and mechanically connected to the circuit board or the circuit board section at a face side and with the other face side can be electrically connected to the circuit board via a separate wiring. Advantageously, this electrically conductive connection can be effected through the spring clip between the face side of the ultrasound transducer which is away from the circuit board towards the circuit board. Since this is typically of metal, it is electrically conductive and furthermore a reliable contacting is ensured by the subjection to spring force.

Advantageously, a water-absorbing means, for example a water-absorbing plastic or a drying agent granulate is provided within the housing of the ultrasound flow meter, in order to bind the moisture which diffuses through the plastic housing wall. This water-absorbing means is advantageously arranged within the intermediate housing. There it can be received as in a dish, which is particularly advantageous on receiving granulates.

Concerning ultrasound flow meters as are applied for detecting the water consumption or however for acquiring the heat quantity, it is counted as belonging to the state of the art to transmit the measurement result to a receiver in a wireless manner at regular intervals. For this, an antenna is to be provided within the housing or on the housing edge, in order to design the emitting range in an adequately large manner given a comparatively small electrical power. Such an antenna is advantageously arranged within the intermediate housing, for example on a peripheral section of the intermediate housing.

A pot-like (pot shape) configuration of the housing is advantageous, since given a suitable contouring of the circuit board and intermediate housing these are held in a positive manner and are fixed within the housing after applying the clamping spring discs. The channel, in which the flow is measured, can be configured with the housing as one piece but can also be formed by a separate pipe or a metal or plastic pipe which is integrated into the housing. It is particularly advantageous if the channel at the base side is integrated into the housing since then the housing space can be utilized particularly well.

For the operation of the ultrasound transducer, for evaluating the measurement results and for transmitting the data, the ultrasound flow meter requires electrical energy which is provided by batteries which are incorporated into the housing, typically at the underside of the circuit board next to the channel. The batteries supply the device over a longer period of time, at all events for so long that no renewed calibration/ no intervention in the device needs to be effected within this time period, so that it is expedient to design the device as a disposable article. This is particularly advantageous if the cover is sealingly welded to the housing, in order in this manner to reliably protect the components which are located within the housing from the influences of the outer environment.

If, as is advantageous, the circuit board at its side which faces the intermediate housing is provided with a display, it is then expedient to provide a recess in the intermediate housing flush with the display and to configure the cover in a transparent manner in this region flush with the display, so that a view upon the display is ensured given a closed cover. Alternatively, a transparent window can also be formed in the intermediate housing in a manner aligned to the display.

The invention is hereinafter explained by way of embodiment examples which are represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Referring to the drawings, with regard to the embodiment variants of an ultrasound flow meter which are shown by way of the figures, it is an electronic water meter having a similar basic construction and function as is described in EP 3 550 272 B1, which is referred to inasmuch as this is concerned (EP 3 550 272 B1 is hereby incorporated by reference in its entirety). It comprises a pot-like housing 1 which is configured as a plastic injection molded part and in the region of the housing base comprises a channel 2 which passes through the housing 1, with an inlet connection 3 as well as an outlet connection 4 which are provided for integration into water conduit, whose flow rates are to be acquired with the ultrasound flow meter. In the represented embodiment, the housing 1, channel 2 and the inlet and outlet connections 3, 4 are configured as single-piece injection molded components.

A circuit board 5 which carries electrical and electronic components of the flow meter is integrated in the housing 1. A display 6 is arranged on the upwardly facing side of the circuit board 5 and two batteries which in the installed state are arranged at both sides of the channel 2 are arranged the lower side. The circuit board 5 at two diametrically opposite sides comprises circuit board sections 8 which are limitedly movable with respect to the remaining circuit board and are merely connected to the circuit board 5 by way of an arm 9. These circuit board sections 8 at their lower side each carry a piezoelectric ultrasound transducer 10.

In the installed position, these ultrasound transducers 10 bear on the channel wall close to the ends of the channel 2 and for this, suitable indentations which positively fix the ultrasound transducer 10 to its face side as well as laterally in a positive manner are provided at the wall side.

The circuit board 5 and the ultrasound transducers 10 which bear on the channel wall of the channel 2, seen in the axial direction are positively and non-positively fastened within the housing 1 by way of an intermediate housing 11. The intermediate housing 11 with regard to its outer contour is adapted to the inner contour of the housing 1 and aligned with the display 6 on the circuit board 7 comprises a recess 12 for which in an aligned manner again a transparent section 13 is provided in a cover 14, so that the display 6 can be read from outside the housing 1.

The intermediate housing 11 in the region aligned to the circuit board sections 8 comprises recesses for receiving helical springs 15 which in the installed position exert a pressing force upon the circuit board sections 8 and by way of this subject the ultrasound transducers 10 to force in the direction of the channel wall of the channel 2, in order to ensure a good acoustic coupling into and out of the channel 2 and the water which is led therein.

Furthermore, a pair of clamping spring discs 16 are arranged within the intermediate housing 11 next to the helical springs 15 and these are provided for the snap connection and clamping connection of the intermediate housing 11 amid the integration of the circuit board 5 within the housing 1. For this, clamping pins 17 which rise from the base of the housing 1 are provided, said clamping pins being arranged in pairs in a manner such that they pass through the circuit board 5 such that one clamping pin 17 of a clamping pin pair is arranged at one side and the other clamping pin 17 of a clamping pair at the other side of a circuit board section 8 or of an ultrasound transducer 10.

The intermediate housing 11 which is closed to the top by way of the cover 14, laterally of the recess 12 comprises cavities 18 which are provided for receiving drying agents and are closed by the cover 14. Furthermore, an antenna 32 is integrated in the intermediate housing.

In the intermediate housing 11, the helical springs 15 and the clamping spring discs 16 are arranged such that the intermediate housing 11 together with these components, quasi as one piece together with the cover 14 (or also without this if this is to be assembled later) can be integrated into the housing 1 above the circuit board 5 from above. The intermediate housing 11 after a suitable alignment is pressed into the housing 1 with a sufficient pressing force, and herein the free ends of the clamping pins 17 pass through the clamping disc springs 16 and these springs clamp-fasten the intermediate housing within the housing 1 in non-releasable manner amid the integration of the circuit board 5. The fastening is effected solely by way of a pressing force, thus without a tool, with a predefined pressing force, until the intermediate housing has reached its designated position within the housing 1. This position is fixed on the clamping pins 17 in a non-releasable manner by way of the clamping disc springs 16. In the represented embodiment, the clamping pins are cylindrical and smooth, but they can be provided with plurality of peripheral grooves in order, apart from the clamping function, to also fulfil a snap function.

In this designated position of the intermediate housing, the helical springs 15 are loaded and supported in the intermediate housing 11. With their free ends, they press upon the circuit board sections 8, on whose lower side the ultrasound transducers 10 are arranged, so that resulting from this they press the ultrasound transducers axially in the direction of the wall of the channel 2.

The cover 14 is snap-fastened in the intermediate housing 11 and can be placed on before joining the intermediate housing 11 into the housing 1, but also after it being joined together. The cover is subsequently peripherally welded to the housing 1, so that the inside of the housing is hermetically closed off with regard to the environment.

Figure 1:
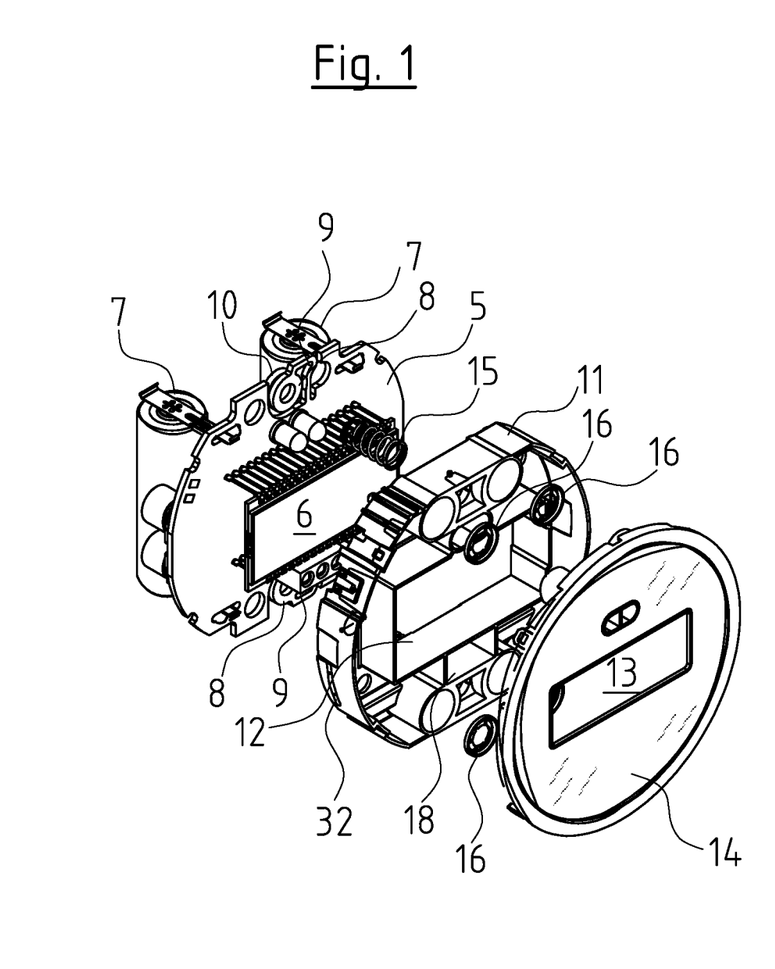
FIG. 1 is a greatly simplified schematic exploded representation showing a circuit board, an intermediate housing and a cover of an ultrasound flow meter.
Figure 2:
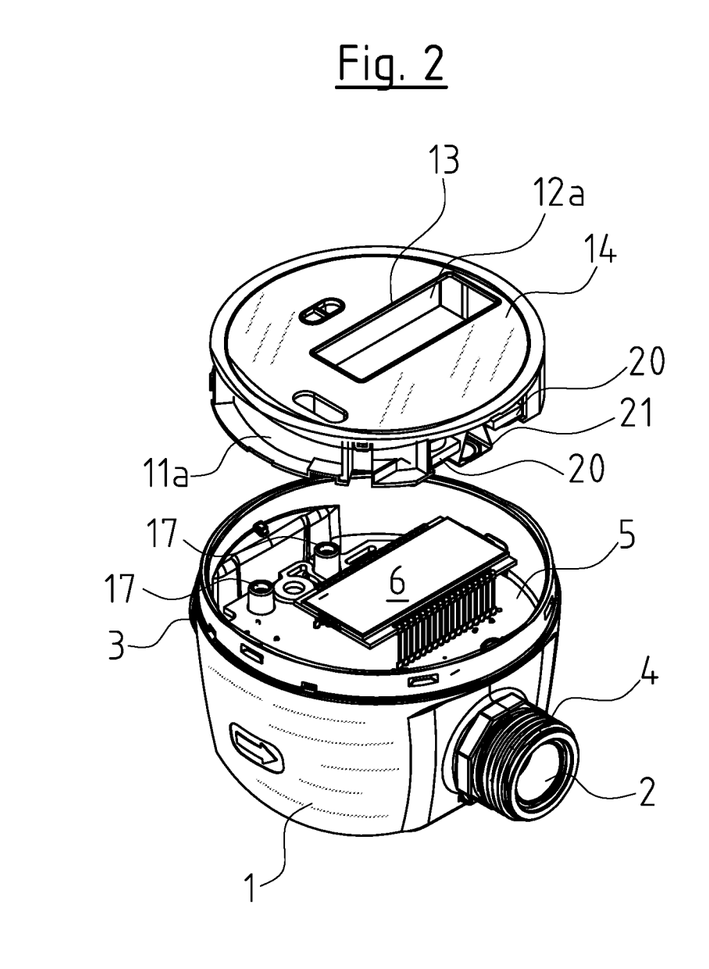
FIG. 2 is an exploded representation showing the housing of an ultrasound flow meter with an integrated circuit board and an intermediate housing with a cover.
Figure 3:
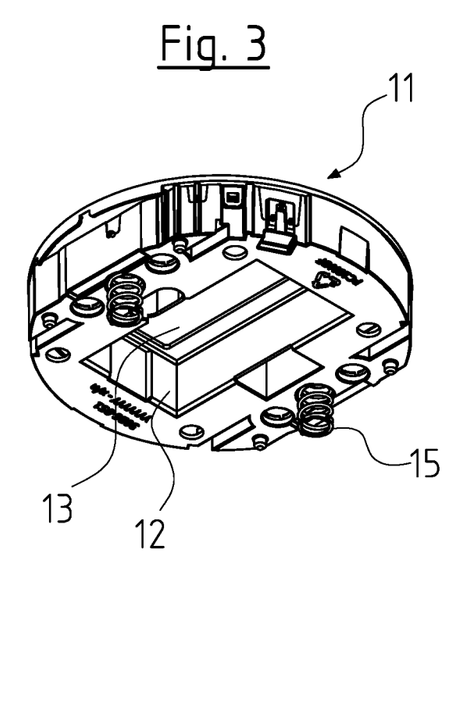
FIG. 3 is a perspective view obliquely from below, showing a first embodiment of an intermediate.
Figure 4:
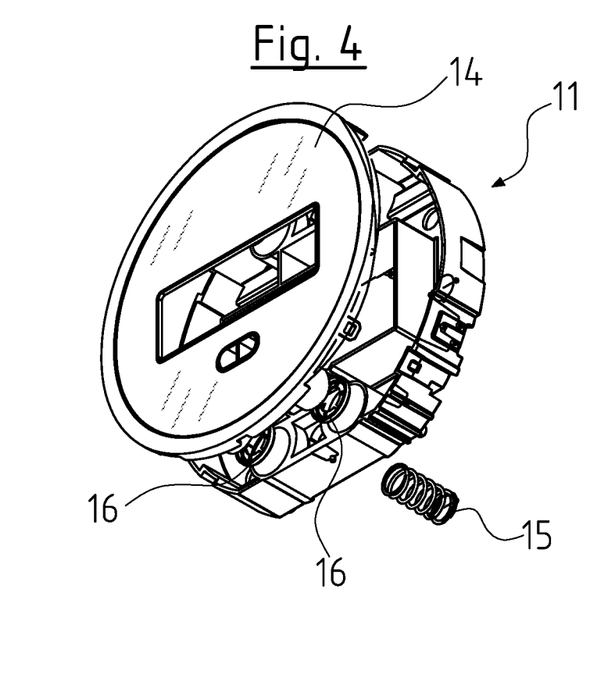
FIG. 4 is a perspective view showing the intermediate housing according to FIG. 3 with the terminating cover.
Figure 5:
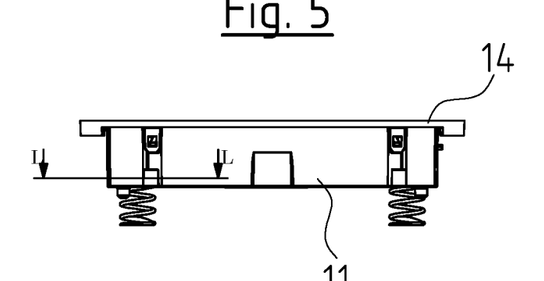
FIG. 5 in a lateral view showing the intermediate housing according to FIG. 3 with a cover.
Figure 6:
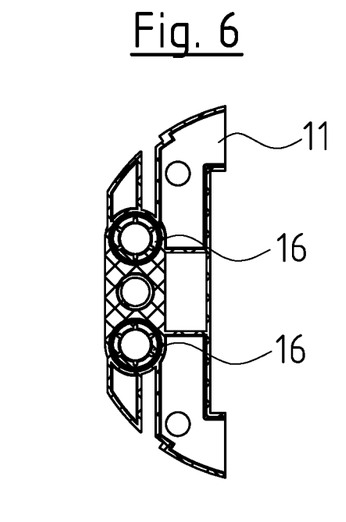
FIG. 6 is a sectional view along the section line L-L in FIG. 5.

The intermediate housing 11 comprises a side wall which is arranged with a small play close to the inside of the housing 1. Concerning the intermediate housing 11a which is represented by way of FIGS. 2 and 7 to 8, the side wall is arranged as a significant distance to the inside of the housing 1 and comprises a collar 19 which bridges this intermediate space. The significant difference between the intermediate housing 11a and the intermediate housing 11 lies in the configuration and arrangement of the clamping spring discs and of the springs for generating the pressing force of the ultrasound transducers 10.

Figure 7:
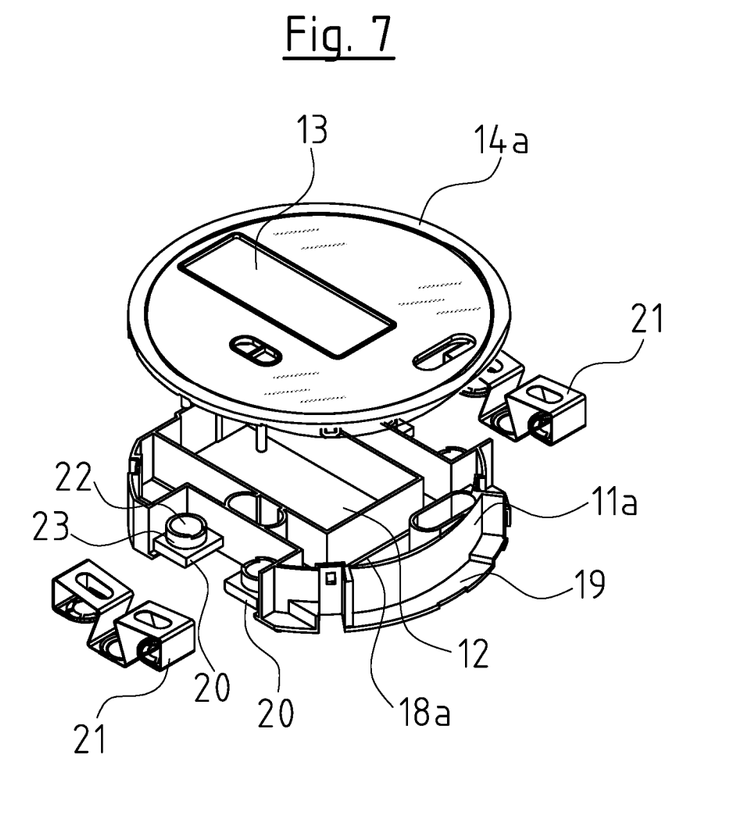
FIG. 7 is an exploded representation of another embodiment of an intermediate housing with spring clips and cover.
Figure 8:
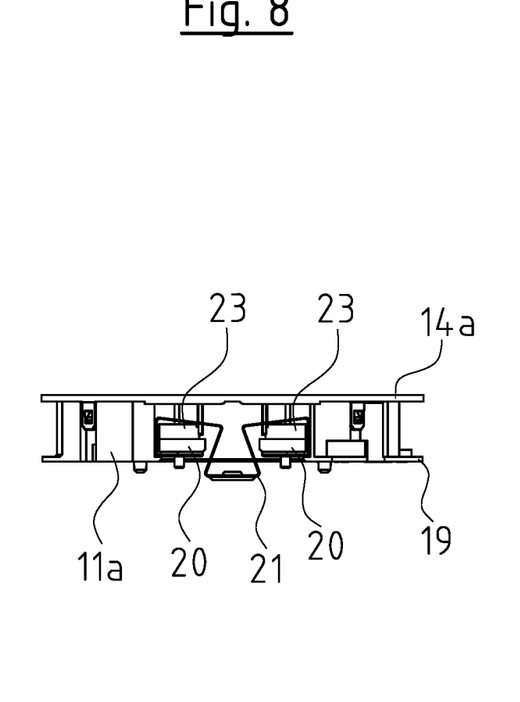
FIG. 8 is a lateral view of the components according to FIG. 7, joined together.
Figures 9, 10:
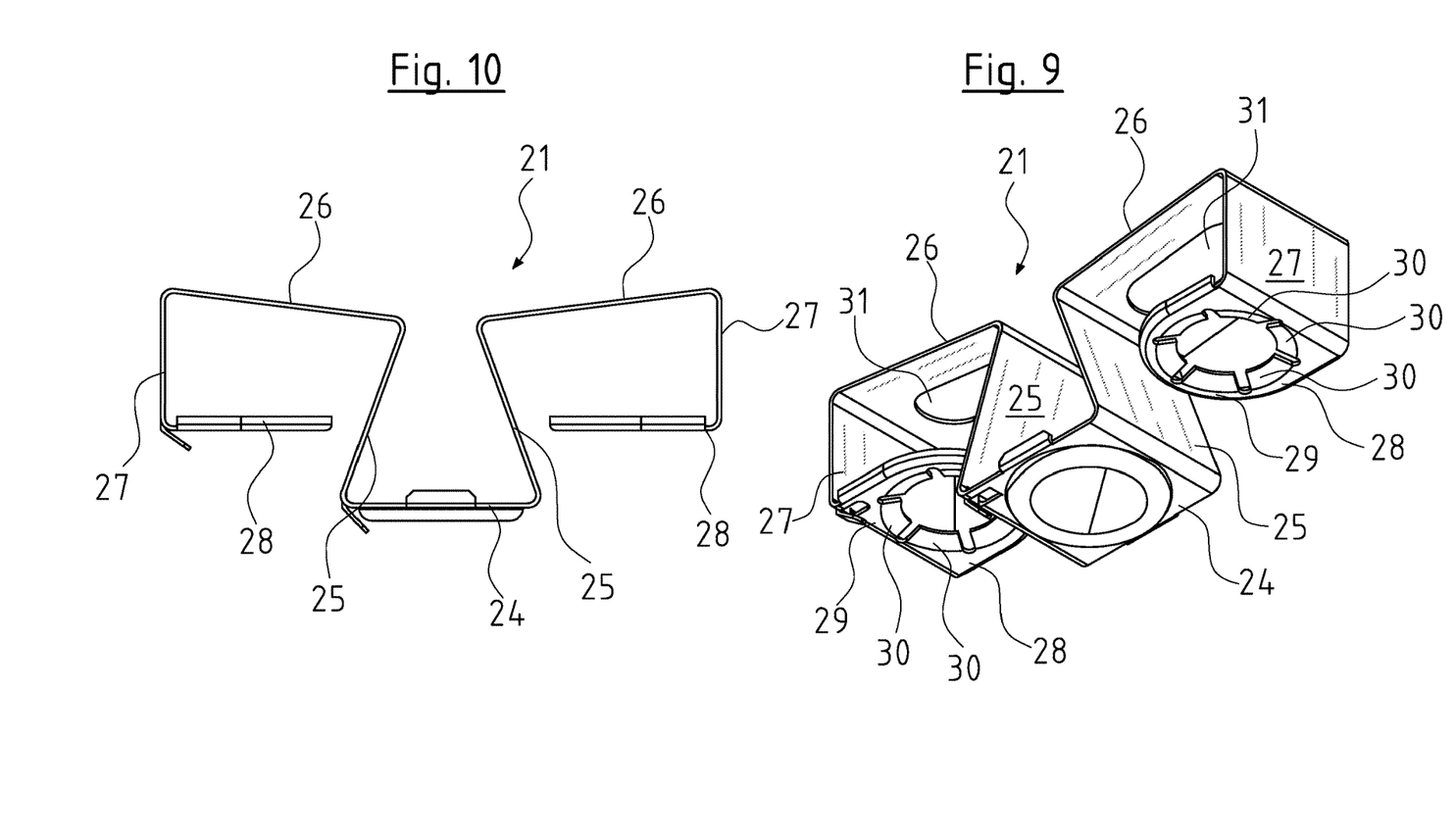
FIG. 9 is a perspective view of the spring clip according to FIG. 7.
FIG. 10 is a lateral view of the spring clip according to FIG. 9.

Concerning the intermediate housing 11a, radially projecting tongues 20 which serve for receiving spring clips 21 are arranged at both sides, roughly in the region where the channel 2 runs through the housing 1 and where concerning the intermediate housing 11 the helical springs 15 and the clamping discs 16 are arranged. As FIGS. 7 and 8 illustrate, the tongues 20 are arranged in pairs, have a cuboid flat shape, each have a central recess 22 and at their upper side are reinforced with a ring section 23 which continues the recess 22 in a flush manner. This arrangement serves for receiving the spring clip 21 which is represented in an enlarged manner by way of the FIGS. 9 and 10.

This spring clip 21 is formed from a strip-like spring sheet and in a lateral view (FIG. 10) has a central, essentially U-shaped section with a web 24 and two limbs 25 which with this embodiment taper upwards in a slightly oblique manner, in order to project angled by 90 obliquely to the side and upwards. These sections 26 merge into sections 27 which in the installed position are directed downwards, thus towards the housing base and whose free end sections 28 run towards the limbs 25. These end sections 28 are configured as clamping spring discs, as is particularly evident from FIG. 9. These end sections 28 thus have an annular part 29 from which radially inwardly projecting segment sections 30 depart. The segment sections 30 form spring tongues, their ends an annulus which is smaller than the outer circumference of a clamping pin 17. These spring clips 21 are integrated laterally into the intermediate housing in a manner such that the tongues 20 with the ring sections 23 engage into the free space which is formed between the end sections 28 and the sections 26 and hold the spring clips 21 there.

Herein, the spring clips 21 with their end sections 28 which are configured as clamping spring discs assume the function of clamping spring discs 16 given the aforementioned embodiment. However, in contrast to the aforedescribed embodiment, it is not a separate spring 15 which is used for generating a pressing force which acts upon the ultrasound transducer 10, but the spring effect of the spring clip 21, in particular the obliquely set limb 25 as well as the sections 26 which connect thereto. The sections 26 are provided with recesses 31 which serve for setting the spring characteristic line, here in order to design the spring in a softer manner.

The spring clips 21 are therefore firstly integrated laterally into the intermediate housing 11 which then together with the spring clips are placed onto the clamping pins 17 below the housing 6 amid the inclusion of the circuit board 5. Due to the pressing of the intermediate housing 11a in the direction of the housing base of the housing 1, the intermediate housing 11a is clampingly fastened onto the clamping pins 17 by way of the clamping spring discs which are formed in the end sections 28, wherein the remaining part of the spring clip 21 springs in axially and is thus loaded, in order to exert a spring force upon a circuit board section 8, on which the ultrasound transducer 10 is arranged, in order to press the ultrasound transducer 10 onto the channel wall.

Figure 11:
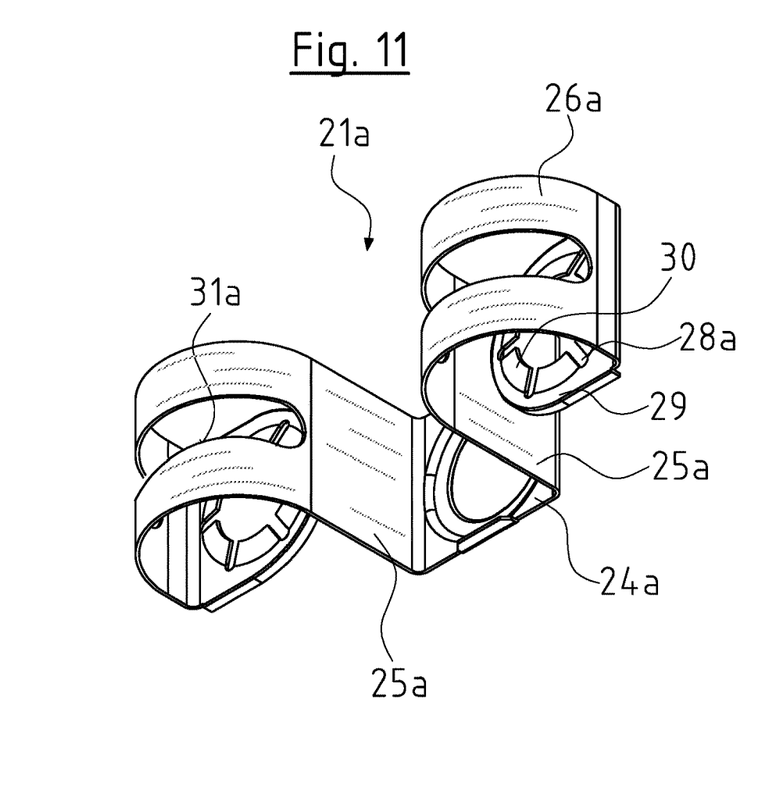
FIG. 11 is a perspective representation of another embodiment of a spring clip.
Figure 12:
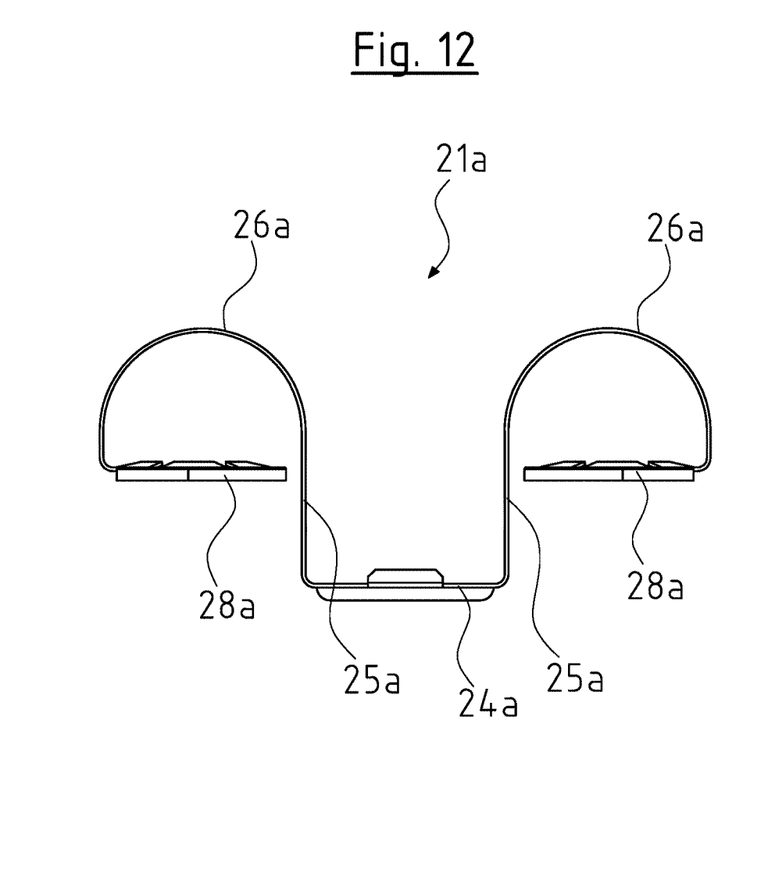
FIG. 12 is a lateral view of the spring clip according to FIG. 11.

A spring clip 21a which likewise comprises a central section which is U-shaped in a lateral view and whose web 24a is at roughly right angles to the limbs 25a is represented by way of FIGS. 11 and 12. There however, the limb ends are continued in a section 26a which is bent away in a circular manner by 180° and at whose ends likewise inwardly projecting end sections 28a which are configured as clamping spring discs are formed. A recess 31a is provided in the arcuate section 26a and in this region has a material weakening for setting the configured spring characteristic line. The function of this spring clip 21a corresponds to that of the spring clip 21 as has been previously described.

Figure 13:
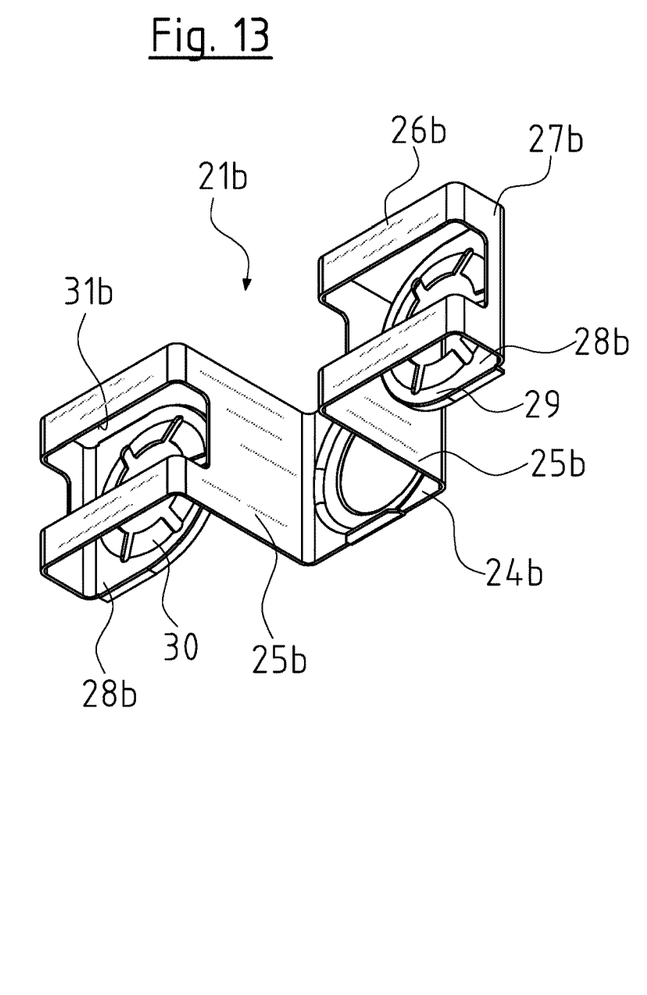
FIG. 13 is a perspective view of a further embodiment of a spring clip.
Figure 14:
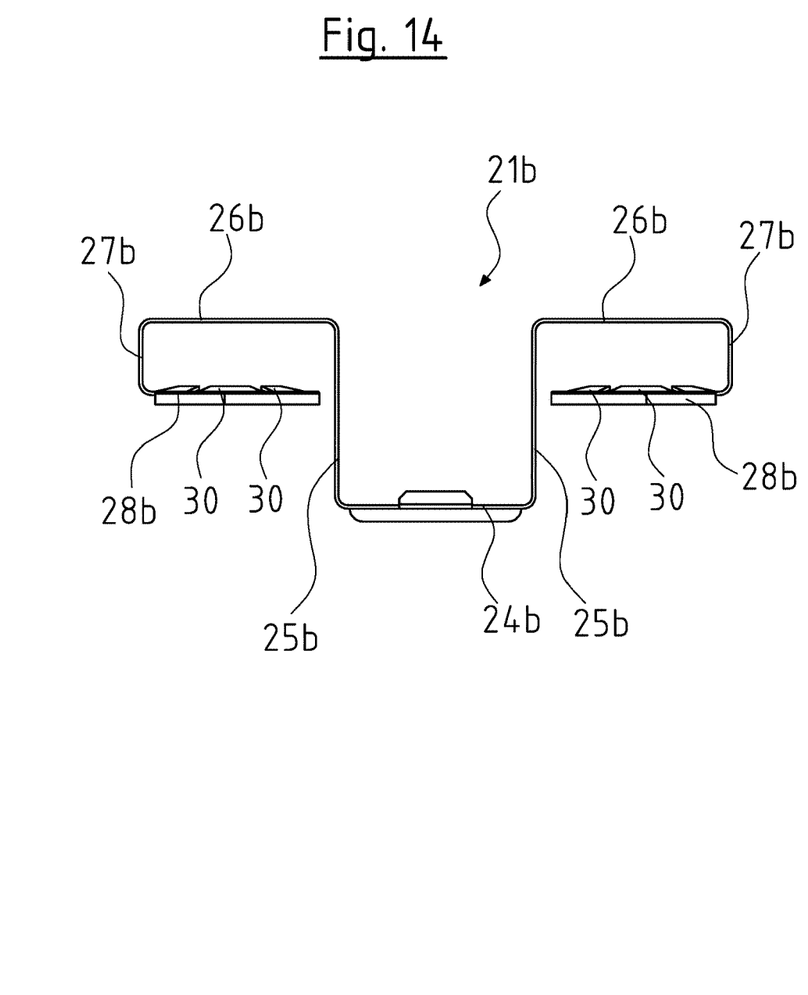
FIG. 14 is a lateral view of the spring clip according to FIG. 13.

An alternative configuration of the spring clip is represented by way of FIGS. 13 and 14. The spring clip 21b likewise comprises an essentially U-shaped central part with a web 24b and limbs 25b which are bent away from the web at right angles. The limb ends are bent away at right angles to the sections 26b which in turn are bent away at right angles to the limb-parallel short sections 27b by 90° which in turn comprise end sections 28b which are bent away by 90° and directed to the limbs 25b and are configured as clamping disc springs. The spring clips 21b comprise essentially almost right-angled bends but comparatively large-surfaced recesses 31b which extend over the entire length of the section 26b as well as over parts of the limb 25b and of the section 27b.

Figure 15:
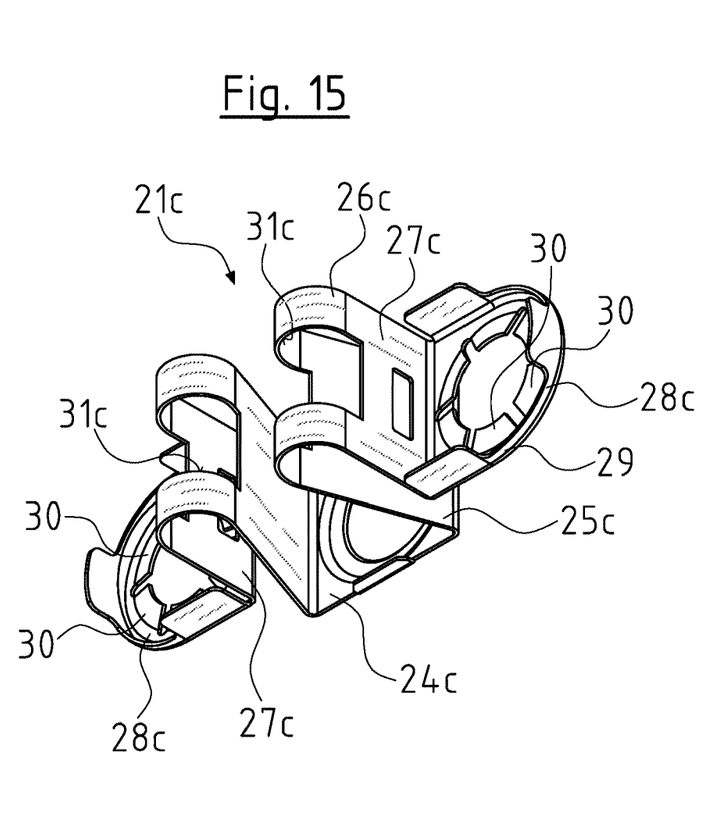
FIG. 15 is a perspective view of a further embodiment of a spring clip.
Figure 16:
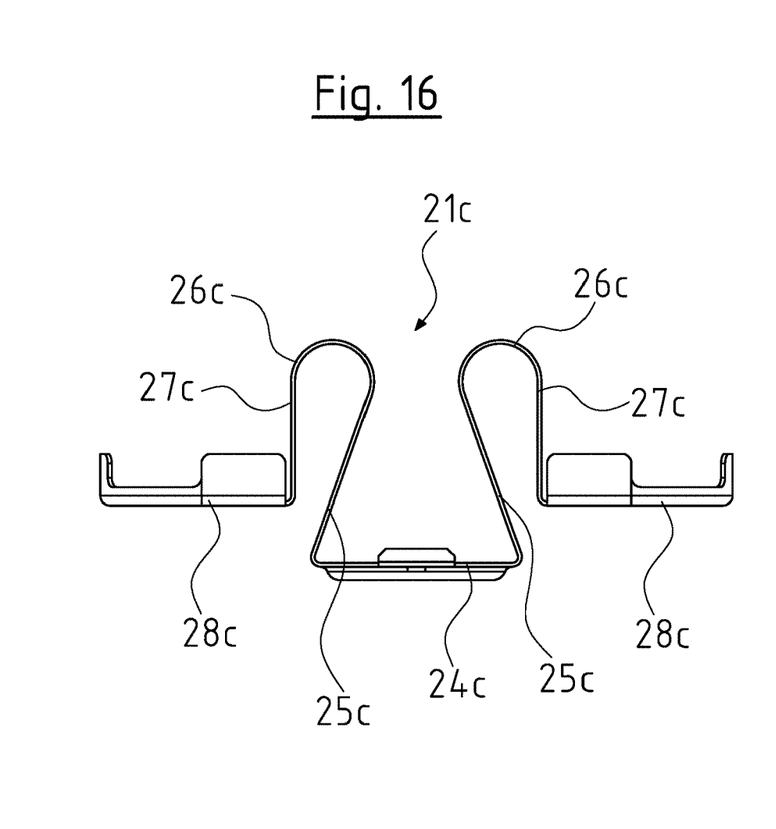
FIG. 16 is a lateral view of the spring clip according to FIG. 15.

A further embodiment variant of a spring clip is represented by way of FIGS. 15 and 16. The spring clip 21c likewise comprises a U-shaped central section with a web 24c and two limbs 25c which from there are inclined slightly inwards. The limb ends in the sections 26c are bent by more than 180° in a manner such that the sections 27c which connect thereto extend perpendicularly to the web 24c, wherein the end sections 28c in turn are bent away to the outside by 90° and there are configured as clamping spring discs. With this embodiment too, recesses 31c are provided and specifically in the region of the sections 26c.

All previously described spring clips have the initially described function and are incorporated laterally into the intermediate housing 11a and together with this are placed onto the clamping pin 17 of the housing 1 and hence clampingly fastened in a non-releasable manner, wherein the spring as a whole is loaded due to the pressing force on spring fastening, in order with its web 24-24c to exert a spring force upon the circuit board section 8 and thus onto the ultrasound transducer 10 which lies therebelow.

While specific embodiments of the invention have been shown and described in detail to illustrate the application of the principles of the invention, it will be understood that the invention may be embodied otherwise without departing from such principles.

LIST OF REFERENCE NUMERALS 1 housing
2 channel
3 inlet connection
4 outlet connection
5 circuit board
6 display
7 batteries
8 circuit board sections
9 arms
10 ultrasound transducer
11 intermediate housing in the FIGS. 1 and 3 to 5
11a intermediate housing in the FIGS. 2, 7 and 8
12 recess in the intermediate housing
13 transparent section in the cover
14 cover 15 helical springs
16 clamping spring discs
17 clamping pins
18 cavities in the intermediate housing
19 collar on the intermediate housing 11a
20 tongues of the intermediate housing 11a
21 spring clip
21a,b,c spring clip
22 recesses in the tongues
23 ring sections
24 web of the U-shaped clip
24a,b,c web
25 limbs of the U-shaped clip
25a,b,c limb
26 clip sections
26a,b,c sections
27 clip sections
27b,c sections
28 end sections of the clip
28a,b,c end sections
29 annular part
30 segment sections
31 recesses
31a,b,c recesses
32 antenna

What is claimed is:

1. An ultrasound flow meter comprising:
a housing;
a housing-side channel for leading through a fluid whose flow is to be measured;
an ultrasound transducer arranged within the housing on a wall which delimits the channel; and
a non-releasable snap connection, an unreleasable clamping connection, or an unreleasable snap connection and unreleasable clamping connection configured to snap connect fix, clamping connect fix, or snap connect and clamping connect fix the ultrasound transducer within the housing.

2. The ultrasound flow meter according to claim 1, wherein the non-releasable snap connection or clamping connection or snap connection and clamping connection comprises:
a clamping pin provided within the housing for the ultrasound transducer;
a clamping spring disc on the clamping pin, wherein the ultrasound transducer is fixed with the clamping spring disc on the clamping pin.

3. The ultrasound flow meter according to claim 2, further comprising:
a circuit board arranged within the housing, circuit board having electrical and electronic components;
a housing cover configured to close the housing;
a spring configuration comprising one or more spring configured for force impingement of the ultrasound transducer and of the clamping spring disc; and
an intermediate housing arranged in the housing between the housing cover and the circuit board and is clamping spring fastened within the housing, the intermediate housing being configured to receive the spring configuration.

4. The ultrasound flow meter according to claim 3, wherein:
the intermediate housing is formed from plastic;
the spring configuration and the clamping spring discs are formed of metal and are positively incorporated into the intermediate housing or are positively incorporated between the housing and the intermediate housing.

5. The ultrasound flow meter according to claim 3, wherein the spring configuration for the force impingement of the ultrasound transducer is formed by at least one helical spring that is arranged at the intermediate housing.

6. The ultrasound flow meter according to claim 3, wherein the spring configuration for force impingement of an ultrasound transducer and for the clamping fastening of the intermediate housing is configured as one piece.

7. The ultrasound flow meter according to claim 3, wherein one or more of:
the intermediate housing receives water-absorbing means;
the intermediate housing receives an antenna;
the housing is configured in a pot-shape;
the channel is integrated into the housing at a base side;
the housing is configured as a plastic injection molded part;
the cover is sealingly welded to the housing;
the circuit board is provided at a circuit board side, which faces the intermediate housing, with a display;
the intermediate housing comprises a recess to provide a region flush with the display;
the cover is configured as transparent at least in the region flush with the display;
the ultrasound flow meter further comprises another ultrasound transducer to provide two ultrasound transducers on diametrically opposite sections of the circuit board and each subjected to force by the spring means.

8. The ultrasound flow meter according to claim 2, further comprising a spring clip comprising a pressing spring for applying force to the ultrasound transducer as well as to the clamping spring disc.

9. The ultrasound flow meter according to claim 8, wherein the intermediate housing comprises an open tongue pair which positively receives the spring clip and through which the clamping pin pair passes from a housing side.

10. The ultrasound flow meter according to claim 8, wherein
the spring clip has a central section which is U-shaped in a lateral view, the central section having a web that impinges the ultrasound transducer or a circuit board section, on which the ultrasound transducer is arranged;
free limb ends of the U-shaped section are bent transversely outwards and each merge into a section which runs parallel to the limb and have a free end section bent away towards the limb; and
each free end section is configured as a clamping spring disc.

11. The ultrasound flow meter according to claim 8, wherein:
the spring clip comprises a central section which is U-shaped in a lateral view, the central section having a web that impinges the ultrasound transducer or a circuit board section, on which the ultrasound transducer is arranged;
free limb ends of the of the U-shaped section are bent away outwards in an arcuate shape by 180° and at an end side comprise web-parallel end sections which are configured as the clamping spring disc and another clamping spring disc.

12. The ultrasound flow meter according to claim 8, wherein:
the spring clip comprises a central section which is U-shaped in a lateral view, the central section having a web that impinges the ultrasound transducer or a circuit board section, on which the ultrasound transducer is arranged;

limbs of the U-shaped section taper obliquely inwards and the free limb ends of the U are bent away obliquely outwards and upwards and each merge into a section which runs parallel to the limb and with a free end section bent away towards the limb configured as the clamping spring disc and another free end section bent away towards the limb configured as another clamping spring disc.

13. The ultrasound flow meter according to claim 8, wherein the spring clip comprises recesses in sections in regions between a central U-shaped section and end sections configured as the clamping spring disc and another clamping spring disc.

14. The ultrasound flow meter according to claim 8, wherein:
   the ultrasound transducer is contacted at two opposite face sides;
   at one face side the ultrasound transducer is electrically conductively connected to a circuit board or to a circuit board section and at the other face side the ultrasound transducer is electrically conductively connected to the circuit board via the spring clip.

15. The ultrasound flow meter according to claim 1, further comprising another ultrasound transducer,
   wherein the non-releasable snap connection or clamping connection or snap connection and clamping connection comprises:
      a clamping pin pair provided within the housing for the ultrasound transducers;
      clamping spring discs on the clamping pins, wherein the ultrasound transducers are fixed with the clamping spring disc on the clamping pin,
   wherein a spring sheet forms the two clamping spring discs for fastening on the clamping pin pair or forms spring means for force impingement of the ultrasound transducer or forms both the two clamping spring discs for fastening on the clamping pin pair and forms spring means for force impingement of the ultrasound transducer.

16. The ultrasound flow meter according to claim 1, further comprising a circuit board arranged within the housing wherein:
   the ultrasound transducer is arranged on a circuit board section which is configured and arranged to be elastically movable with respect to a remaining circuit board section; and
   the ultrasound transducer is connected to the circuit board section by a permanent-elastic electrically conductive adhesive.

17. A method for generating a pressing force between a piezoelectric ultrasound transducer and a channel wall of an ultrasound flow meter comprising a housing the method comprising the steps of:
   fastening the ultrasound transducer unreleasably by way of a snap connection/clamping connection that simultaneously subjects the ultrasound transducer to spring force.

18. An ultrasound flow meter comprising:
   a housing;
   a housing-side channel for leading through a fluid whose flow is to be measured;
   an ultrasound transducer arranged within the housing on a wall which delimits the channel; and
   a non-releasable snap connection, clamping connection, or snap connection and clamping connection configured to snap connect fix, clamping connect fix, or snap connect and clamping connect fix the ultrasound transducer within the housing, wherein the non-releasable snap connection or clamping connection or snap connection and clamping connection comprises:
      a clamping pin provided within the housing for the ultrasound transducer;
      a clamping spring disc on the clamping pin, wherein the ultrasound transducer is fixed with the clamping spring disc on the clamping pin.

19. The ultrasound flow meter according to claim 18, further comprising:
   a circuit board arranged within the housing, circuit board having electrical and electronic components;
   a housing cover configured to close the housing;
   a spring configuration comprising one or more spring configured for force impingement of the ultrasound transducer and of the clamping spring disc; and
   an intermediate housing arranged in the housing between the housing cover and the circuit board and is clamping spring fastened within the housing, the intermediate housing being configured to receive the spring configuration.

* * * * *